Jan. 17, 1961 G. P. SUTTON ET AL 2,968,245
SPINNING ROCKET

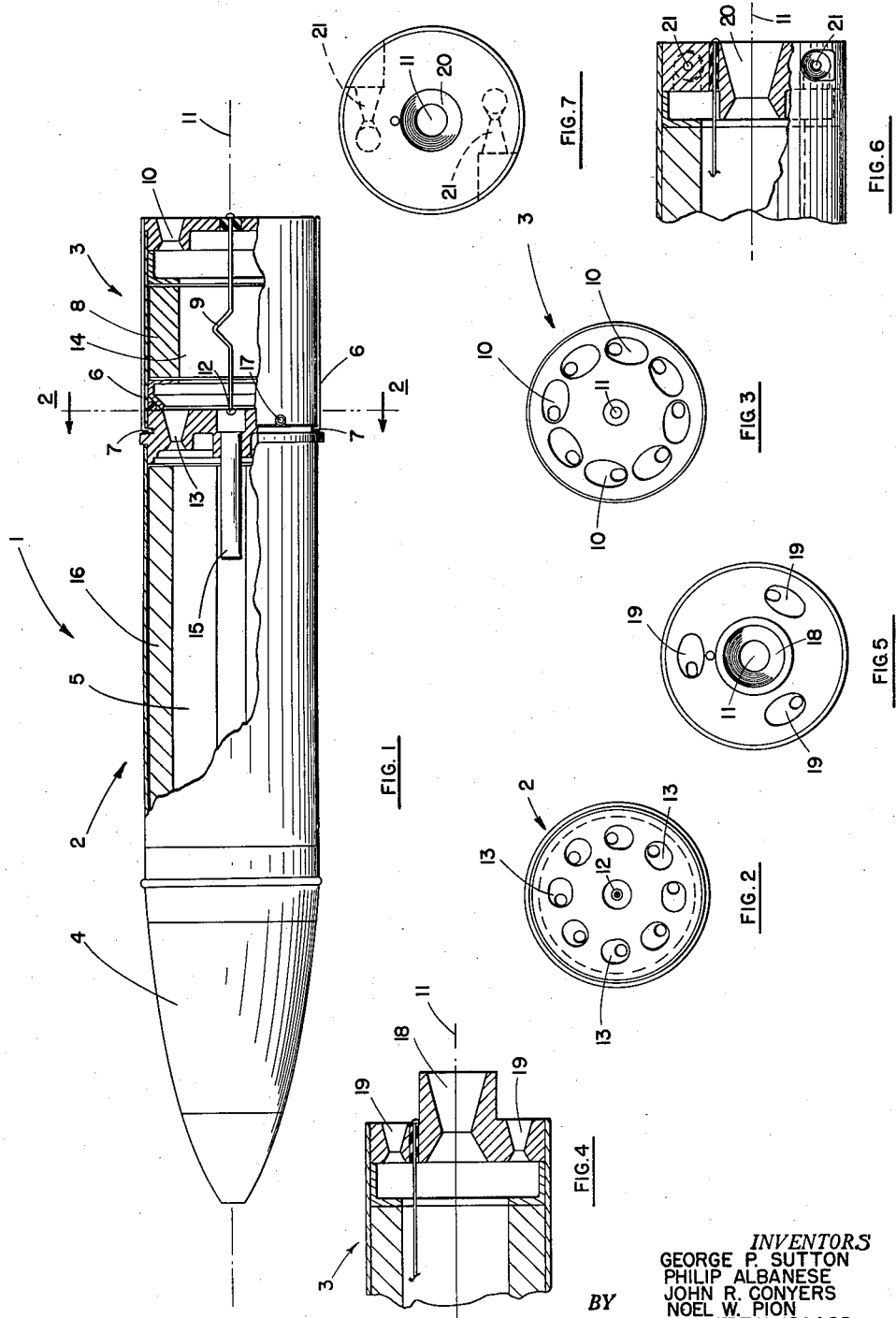

Filed Aug. 28, 1953 2 Sheets-Sheet 2

FIG. 8
FIG. 9
FIG. 10
FIG. 11
FIG. 12
FIG. 13
FIG. 14
FIG. 15
FIG. 16

INVENTORS
GEORGE P. SUTTON
PHILIP ALBANESE
JOHN R. CONYERS
NOEL W. PION
HERBERT H. ISAACS

BY William R. Lane
ATTORNEY

# United States Patent Office 2,968,245
Patented Jan. 17, 1961

2,968,245

SPINNING ROCKET

George P. Sutton, Downey, Philip Albanese, Long Beach, John R. Conyers, Reseda, Noel W. Pion, Los Angeles, and Herbert H. Isaacs, Rivera, Calif., assignors to North American Aviation, Inc.

Filed Aug. 28, 1953, Ser. No. 377,082

5 Claims. (Cl. 102—51)

This invention pertains to a rocket and, more particularly, to a rocket which is adapted to be rapidly spun about its longitudinal axis.

The device contemplated by this invention is capable of being used on all types of aircraft, as well as in connection with tanks, land emplacements and the like. When the rocket contemplated by this invention is launched from a moving platform, such as a moving aircraft, it can be launched in any direction, including a direction opposite to the direction of movement of the aircraft, and still remain stable. Because the rocket contemplated by this invention is continuously spinning at a high angular velocity about its longitudinal axis, the rocket remains stable and does not veer or tumble in flight.

The device of this invention carries with it a spin cartridge which is attached to bring the velocity of spin of the rocket about its longitudinal axis to a predetermined critical velocity in an extremely short length of time in order to further stabilize the rocket, as set forth herein.

It is therefore an object of this invention to provide a spinning rocket.

It is another object of this invention to provide a rocket which spins about its longitudinal axis.

It is another object of this invention to provide a spin cartridge to angularly accelerate a rocket about its longitudinal axis.

It is another object of this invention to provide a two-stage spin rocket.

It is another object of this invention to provide automatically detachable means for applying an angular acceleration about the longitudinal axis of a rocket.

It is another object of this invention to provide means, attached to a rocket, for angularly accelerating said rocket about its longitudinal axis.

It is another object of this invention to provide a detachable cartridge, connected to the after end of a rocket, for applying a high initial angular acceleration about the longitudinal axis of said rocket.

It is another object of this invention to provide means, integral with a rocket, for angularly accelerating said rocket at a high acceleration.

It is still another object of this invention to provide means, attached to a rocket, for applying a torque about the longitudinal axis of said rocket.

It is still another object of this invention to provide, in combination, a spin rocket incorporating means for producing forward thrust and spin and a detachable anterior high angular acceleration spin cartridge automatically detachable when spent.

It is another object of this invention to provide automatically detachable tangential acceleration applying means for applying a rotational acceleration about the longitudinal axis of a rocket.

It is another object of this invention to provide means, for attaching a spin cartridge to a rocket, which automatically detaches said spin cartridge from said rocket after said rocket leaves its launching tube.

It is another object of this invention to provide means for automatically detaching a spin cartridge from a rocket.

It is still another object of this invention to provide means for automatically detaching a second stage from a first stage of a two-stage spinning rocket.

Other objects will become apparent from the following description taken in connection with the accompanying drawings, in which Fig. 1 is a view, partly in section, of the rocket and spin cartridge of this invention;

Fig. 2 is a view taken at 2—2 of Fig. 1 with the spin cartridge removed;

Fig. 3 is a view taken from the right in Fig. 1;

Fig. 4 is a second configuration of the rocket nozzles of the spin cartridge of this invention;

Fig. 5 is a view taken from the right in Fig. 4;

Fig. 6 is a third configuration of the rocket nozzles of the spin cartridge of this invention;

Fig. 7 is a view taken from the right in Fig. 6;

Fig. 8 is an embodiment of the spin cartridge of this invention showing a second embodiment of the attaching mechanism thereof;

Fig. 9 is a view taken at 9—9 in Fig. 8;

Fig. 10 is an embodiment of the spin cartridge of this invention showing a third embodiment of the attaching mechanism thereof;

Fig. 11 is a view taken at 11—11 in Fig. 10;

Fig. 12 is a view of the device shown in Fig. 11 showing an additional latching device thereof;

Fig. 13 is an embodiment of the spin cartridge of this invention showing a fourth embodiment of the attaching mechanism thereof;

Fig. 14 is a view taken at 14—14 in Fig. 13;

Fig. 15 is an emboidment of the spin cartridge of this invention showing a fifth embodiment of the attaching mechanism thereof;

And Fig. 16 is an enlarged view of the attaching means of Fig. 15.

In Fig. 1, the two-stage spin rocket 1 is divided into rocket 2 and spin cartridge 3. The embodiment of rocket 2 shown in Fig. 1 has tapered nose 4 and propellent chamber 5. Spin cartridge 3 is attached to rocket 2 by means adaptable to be automatically detached. The attaching means is adapted to be detached in response to, for example, centrifugal force, the gas pressure between rocket 2 and cartridge 3, a lanyard attached to the end of the launching tube, the torque differential between rocket 2 and cartridge 3 after the propellant within cartridge 3 burns out, a mechanism at the end of the launching tube, accelerometer means, or means responsive to the velocity of rocket 2. In the embodiment shown in this application, the detaching means is responsive to both centrifugal force and the gas pressure between rocket 2 and cartridge 3. The attaching means shown in Fig. 1 includes attaching clips 6 which fit into groove means 7 upon the exterior surface of rocket 2. Groove means 7 is inclined in an aft direction in order that clips 6 may slide free of groove means 7.

Spin cartridge 3 need not contain propellants, but preferably contains a fast-burning powder charge 8 within chamber 14. Propellent gases are obtained from powder charge 8 and propellants 16 within chamber 5. Igniter wire 9 passes through chamber 14 and contacts conducting button 12 upon igniter 15 within chamber 5 to ignite propellants 16. Chamber 5 has openings at nozzles 13 which open into chamber 14 when spin cartridge 3 is attached. Chamber 14 has openings at ports or nozzles 10, which are arranged circumferentially in a symmetrical pattern about the longitudinal axis of cartridge 3, in Fig. 3, canted at a high angle tangentially about axis 11 to cause a substantial portion of the thrust of each nozzle 10 to create a twist or torque about longitudinal axis 11. Thrust nozzles 13 upon the after end of rocket 2 are canted slightly in a tangential direction about axis 11 to increase the angular velocity of rocket 2 after spin cartridge 3 is detached therefrom. In the embodiment shown in Fig. 1, powder charge 8 is ignited by the hot gases from nozzle 13. Alternatively, powder charge 8 can be ignited by a separate igniter (not shown), and the hot gases from chamber 14 would then pass into chamber 5 to ignite propellants 16. A plurality of torque pins 17 of which only one is shown are symmetrically arranged circumferentially about the periphery of the after portion of rocket 2 to carry torque to rocket 2 from cartridge 3.

In Figs. 4 and 5 an alternative arrangement of the nozzles upon the after end of spin cartridge 3 is shown. Nozzle 18 is directed straight aft to provide thrust while nozzles 19 are canted tangentially to provide a torque about axis 11. While only three nozzles 19 are shown in Fig. 5, obviously two, three, four or more nozzles symmetrically arranged circumferentially about axis 11 operate satisfactorily.

A third embodiment of the nozzle configuration upon the after end of spin cartridge 3 is shown more particularly in Figs. 6 and 7. In Figs. 6 and 7, nozzle 20 is directed straight aft to provide thrust. Nozzles 21 are directed tangentially to supply a torque about axis 11. While only two nozzles 21 are shown, obviously more than two operate satisfactorily provided they are equally spaced circumferentially at the same radius about axis 11. Any one of the three nozzle configurations shown in Figs. 1–7 can be used upon the after end of spin cartridge 3.

Figs. 8–16 more particularly set forth the various embodiments of the locking mechanism for attaching spin cartridge 3 to rocket 2. Any one of the latch or attaching mechanisms set forth therein can be used with any one of the previously mentioned rocket configurations to attach spin cartridge 3 to rocket 2. With each of the configurations, spin cartridge 3 automatically detaches from rocket 2 after rocket 2 leaves its launching tube (not shown).

In Figs. 8 and 9, at least two cams 22 and 23 are attached to rotate about pins 24 and 25, respectively. Arm 26 is rigidly attached to cam 22 and arm 27 is rigidly attached to cam 23. Arms 26 and 27 are free to move outward. Cam 22 is attached by shaft 24 to spin cartridge 3 and engages flange 28 upon rocket 2. The axial line of separation between rocket 2 and cartridge 3 is outboard from the center of rotation of shafts 24 and 25. Cam 23 is attached by means of shaft 25 to spin cartridge 3 and engages flange 28a upon rocket 2. Arms 26 and 27 rest in the closed position in slots 30 on spin cartridge 3. Stops 60 prevent cartridge 3 from sliding sideways with respect to rocket 2. The torque from cartridge 3 to rocket 2 is carried by cams 22 and 23 across faces 31 and 32 of flanges 28 and 28a.

In Figs. 10 and 11, U-clamps 33 and 34 fit within rings 35 and 36 upon rocket 2 and spin cartridge 3, respectively. A plurality of balls 37 fit into sockest 38 and 39 in rings 35 and 36, respectively. Faces 40 and 41 are inclined at an angle. The angle of inclination of faces 40 and 41 is preferably such that the gas pressure forces, which tend to separate cartridge 3 from rocket 2, apply a force to U-clamps 33 and 34 to force them outward after rocket 2 leaves its launching tube (not shown).

A modified version of the device shown in Figs. 10 and 11 is shown in Fig. 12 wherein rings 33 and 34 are further held together by clamps 42, which are adapted to ride along the launching tube (not shown) to prevent clamps 33 and 34 from rubbing against the launching tube. Clamps 42 are thrown free because of the forces upon the inclined surfaces between clamps 42 and clamps 33 and 34.

In Figs. 13 and 14, a plurality of balls 43 are symmetrically disposed about the longitudinal axis of rocket 2. Each ball 43 fits into a slot 44 on rocket 2 and a slot 45 in cartridge 3. The axial dividing line between rocket 2 and cartridge 3 does not pass through the center of balls 43, but passes inboard thereof, so that the forces due to expanding gases in the rocket chambers of rocket 2 tend to push balls 43 outward. Springs 46 are cantilevered on the outside surface of spin cartridge 3 to hold balls 43 in position.

In Figs. 15 and 16, rocket 2 and spin cartridge 3 are fastened together by means of a plurality of keys 47. The structure is best explained by reference to Fig. 16. Keys 47 mechanically engage rocket 2 externally at surfaces 48 and engage spin cartridge 3 internally at surfaces 49. Alternatively, keys 47 engage rocket 2 internally and engage cartridge 3 externally. Surfaces 48 are inclined so that the gas force, which tends to separate rocket 2 and cartridge 3 tends to force keys 47 outward. The surface between keys 47 and cartridge 3 is inclined or rounded as shown at 49. Keys 47 are adapted to turn about points 50 after rocket 2 has left its launching tube (not shown) to release spin cartridge 3 from rocket 2. Key 47 is not hinged at point 50 but slides freely. A plurality of pins 51, of which one is shown, carry torque from cartridge 3 to rocket 2.

In operation, an electrical current from the launcher (not shown) passes through igniter wire 9 to igniter 15 within chamber 5. When propellant 16 within chamber 5 is ignited, exhaust gases exit through nozzles 13 into chamber 14 to ignite propellant 8, then through nozzles 10 to create a tangential force about axis 11 to cause spin cartridge 1 to accelerate angularly at a high rate about axis 11. The flow of gas between chamber 5 and chamber 14 creates a force between rocket 2 and spin cartridge 3 which tends to separate them. Because, in the preferred embodiment, the powder within chamber 8 is extremely fast-burning, and because nozzles 10 are canted at a very high angle, rocket 1 accelerates in a very short length of time to a predetermined angular velocity about axis 11. In the preferred embodiment, rocket 1 reaches its designed angular velocity by the time it leaves the launching tube (not shown), and cartridge 3 is detached from rocket 2 soon thereafter. In each of the attaching mechanisms shown, the mechanism can be designed so that when the launching tube is no longer present, cartridge 3 is automatically detached from rocket 2. The angular velocity of rocket 1 about axis 11, together with the gas pressure between rocket 2 and cartridge 3, causes clips 6, of Fig. 1, to move radially in cantilever fashion out of grooves 7 to detach spin cartridge 3 from rocket 2.

Because of its inertia, rocket 2 continues to spin, being only slowed by friction and the like. Because nozzles 13 are highly canted the loss in angular velocity of rocket 2 is overcome, and the angular velocity of rocket 2 is increased to maintain itself above a predetermined critical velocity. The majority of the thrust from nozzles 13 projects rocket 2 further in the direction of a potential target.

In Figs. 4 and 5, expanding gases pass through nozzle 18 to provide forward thrust to rocket 1 while expanding gases pass through nozzle 19 to provide a rotative torque about the longitudinal axis of rocket 1.

In Figs. 6 and 7, expanding gases pass through nozzle 20 to provide forward thrust for rocket 1 while expanding gases pass tangentially outward from nozzles 21 to provide a rotative torque about longitudinal axis 11.

In Figs. 8 and 9, when rocket 2 leaves its launching tube (not shown), the gas pressure between rocket 2 and cartridge 3 pushes eccentrically against cams 22 and 23 which, together with the centrifugal force upon arms 26 and 27, causes levers or arms 26 and 27 to extend outward, turning cams 22 and 23 so that the flat portions 31 and 32 thereof disengage flanges 28 and 28a to free spin cartridge 3 from rocket 2.

In Figs. 10 and 11, when rocket 2 leaves its launching tube (not shown), the force of the gases between rocket 2 and cartridge 3 presses outward at surfaces 40 and 41 to expel clips 33 and 34, whereupon cartridge 3 is detached from rocket 2. Balls 37 carry torque from spin cartridge 3 to rocket 2.

In the embodiment shown in Fig. 12, the forces tending to expel clamps 33 and 34 create an expelling force against clamps 42 at the inclined surfaces of contact between clamps 42 and clamps 33 and 34 to cause clamps 42 to be expelled outward to thereby release clamps 33 and 34. Clamps 33 and 34 are then further expelled to release cartridge 3 from rocket 2. In the embodiment of Fig. 12, the friction between rocket 2 and its launching tube is reduced over the embodiment in Figs. 10 and 11 because only clamps 42 ride along the launching tube.

In Figs. 13 and 14, gas pressures between rocket 2 and cartridge 3 create a force which tends to separate the cartridge axially from the rocket. Since the axial separation line is in-board of the center of ball 43 the axial force is transmitted to balls 43 as a radial force. Thus, when rocket 2 leaves its launching tube (not shown) ball 43 presses against springs 46 which open in cantilever fashion to allow ball 43 to disengage slots 44 in rocket 2. Balls 43 carry the torque between spin cartridge 3 and rocket 2.

In Figs. 15 and 16, the torque between cartridge 3 and rocket 2 is carried by means of pins 51 of which only one is shown in Fig. 15. When rocket 2 leaves its launching tube the gaseous forces which tend to separate cartridge 3 from rocket 2 press outward upon keys 47 at surfaces 48 and inward at surfaces 49 so that keys 47 rotate and slide at point 50 to disengage rocket 2 from cartridge 3. When rocket 2 is within its tube, only keys 47 touch the side of the tube and the friction is thereby decreased.

It is therefore clear that the device of this invention is a stabilized rocket which, by virtue of the angular acceleration potential of spin cartridge 3, maintains its stabilization when fired, and further, that the stabilization of the rocket of this invention is increased because the rocket is continuously angularly accelerated and is not dependent upon bringing the rocket up to a high forward speed prior to launching.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for attaching spin cartridge means to rocket means launchable from a launching tube comprising an annular ring upon the after end of said rocket means, an annular ring upon the forward end of said spin cartridge means, U clamps for holding said rings in connection adapted to fly off when said spin cartridge means leaves said launching tube, and a plurality of balls symmetrically circumferentially disposed about the longitudinal axis of said rocket means together with sockets upon the after end of said rocket means and the forward end of said spin cartridge means adapted to engage said balls to carry torque from said spin cartridge means to said rocket means.

2. A spinning rocket adapted to be launched from a launching tube comprising rocket means including propellent means, said rocket means having rocket nozzle means at its after end adapted to both propel said rocket means forward and to increase the initial spin of said rocket means, spin cartridge means adapted to spin at a high angular acceleration, an annular ring upon the after end of said rocket means, an annular ring upon the forward end of said spin cartridge means, U clamps for holding said rings in connection adapted to release said rings when said spin cartridge means leaves its launching tube, and a plurality of balls symmetrically circumferentially disposed about the longitudinal axis of said rocket means, together with sockets upon the after end of said rocket means and the forward end of said spin cartridge means adapted to engage said balls to carry torque from said spin cartridge means to said rocket means.

3. A spinning rocket comprising rocket means adapted to be launched from a launching tube, spin cartridge means adapted to spin said rocket means and said spin cartridge means, an annular ring upon the after end of said rocket means, an annular ring upon the forward end of said spin cartridge means, U clamps for holding said rings in connection adapted to disconnect said rings when said spin cartridge means leaves said launching tube, and a plurality of balls symmetrically circumferentially disposed about the longitudinal axis of said rocket means together with sockets upon the after end of said rocket means and the forward end of said spin cartridge means adapted to engage said balls to carry torque from said spin cartridge means to said rocket means.

4. Means for attaching a spin cartridge to a rocket adapted for launching from a tube comprising an annular ring upon the after end of said rocket, an annular ring upon the forward end of said spin cartridge, a first pair of U clamps engaging said rings, each said U clamp having ends and each said end including an axially disposed flange, a second pair of U clamps, each of said last mentioned clamps engaging one of said axially disposed flanges upon each said first pair of U clamps, and detent means engaging said rocket and said spin cartridge to prevent relative rotation thereof.

5. The invention of claim 4 wherein the outer surfaces of said second pair of U clamps are adapted to contact an inner surface of the launching tube prior to ejection therefrom, said second pair of clamps preventing similar contact by said first pair of clamps, said clamps being radially disengageable upon exit from the launching tube through the action of centrifugal force and separation forces of said rockets and said spin cartridge.

References Cited in the file of this patent

UNITED STATES PATENTS

| 1,209,611 | Mustin | Dec. 19, 1916 |
| 2,422,721 | Farr | June 24, 1947 |
| 2,503,269 | Hickman | Apr. 11, 1950 |
| 2,809,584 | Smith | Oct. 15, 1957 |

FOREIGN PATENTS

| 566 | Great Britain | of 1883 |
| 301,298 | Germany | Jan. 12, 1920 |
| 305,160 | Germany | Mar. 3, 1920 |
| 812,680 | France | May 14, 1937 |
| 116,430 | Sweden | May 21, 1946 |
| 120,158 | Sweden | Nov. 11, 1947 |